Feb. 16, 1943. F. B. ADAM ET AL Re. 22,266

CIRCUIT INTERRUPTING AND PROTECTING DEVICE

Original Filed June 29, 1936 5 Sheets-Sheet 1

INVENTORS
FREDERICK B. ADAM
HENRY M. STIEGLITZ
BY Roy M. Eilers
ATTORNEY.

CIRCUIT INTERRUPTING AND PROTECTING DEVICE

Original Filed June 29, 1936 5 Sheets-Sheet 2

INVENTORS
FREDERICK B. ADAM
HENRY M. STIEGLITZ
BY Roy M. Eilers
ATTORNEY.

CIRCUIT INTERRUPTING AND PROTECTING DEVICE

Original Filed June 29, 1936 5 Sheets-Sheet 3

INVENTORS
FREDERICK B. ADAM
HENRY M. STIEGLITZ
BY Roy M. Eilers
ATTORNEY.

Feb. 16, 1943. F. B. ADAM ET AL Re. 22,266
CIRCUIT INTERRUPTING AND PROTECTING DEVICE
Original Filed June 29, 1936 5 Sheets-Sheet 4
Fig. 18.
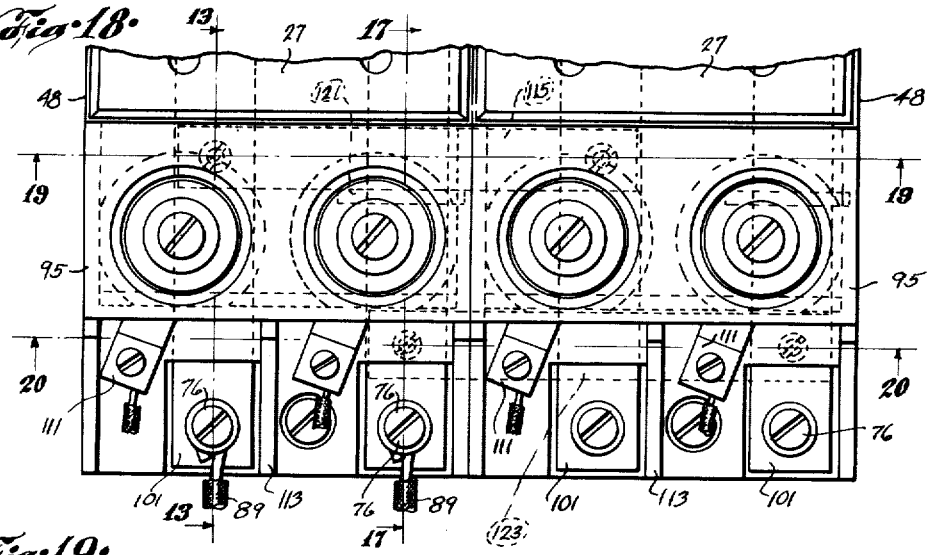
Fig. 19.
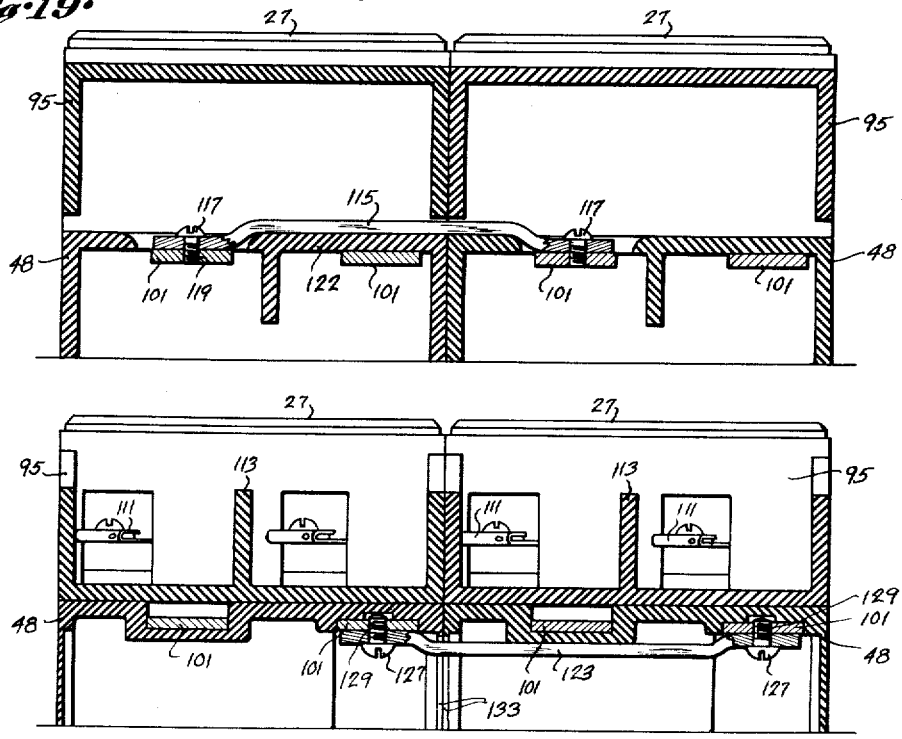
Fig. 20.
INVENTORS
FREDERICK B. ADAM
HENRY M. STIEGLITZ
BY
Roy M. Eilers
ATTORNEY.

Feb. 16, 1943. F. B. ADAM ET AL Re. 22,266

CIRCUIT INTERRUPTING AND PROTECTING DEVICE

Original Filed June 29, 1936 5 Sheets-Sheet 5

INVENTORS
FREDERICK B. ADAM
HENRY M. STIEGLITZ
BY Roy M. Eilers
ATTORNEY

Reissued Feb. 16, 1943 Re. 22,266

UNITED STATES PATENT OFFICE 22,266

CIRCUIT INTERRUPTING AND PROTECTING DEVICE

Frederick B. Adam, St. Louis County, and Henry M. Stieglitz, St. Louis, Mo., assignors to Frank Adam Electric Company, St. Louis, Mo., a corporation of Missouri Original No. 2,186,813, dated January 9, 1940, Serial No. 87,858, June 29, 1936. Application for reissue July 9, 1942, Serial No. 450,322

19 Claims. (Cl. 200—114)

This invention relates to circuit interrupting and protecting devices and more particularly to an improved safety type pull switch with fuse.

An object of this invention is to provide a safety type of dead front fuse and switch combination, which by reason of a novel design and construction of parts, is unusually compact, has few parts and is easy to assemble, thereby adapting it for application to assemblies of service equipment and panelboards.

Another object of this invention is to provide a switch in which the switch contact blades serve as a means to hold and clamp fuses which cause the switch contact blades to spread apart and produce a tight fit between the switch contact blades and cooperating receiving contacts, thus insuring good electrical contact there-between.

Another object of this invention is to provide a switch wherein the switch contact blade receiving parts are entirely covered so that no live parts are exposed when the switch blades are removed therefrom.

Another object of this invention is to provide a fuse carrying means and associated contact block which allows the fuse carrying means to be inserted in the contact block in either one of two positions, the one position causing the fuses in the fuse carrying means to close the associated circuit contacts and the other position serving merely as a means of supporting the fuse carrying means, the circuit contacts remaining open.

Another object of this invention is to provide switch blades having portions thereof adapted to receive and hold a fuse which allow easy insertion and removal of fuses when removed from switch blade receiving contacts and yet clamp the fuses tightly therein when they are inserted in the receiving contacts, thus avoiding undesirable heating of the fuse contact parts.

Another object of this invention is to provide a base, either with or without side walls, with the proper slots and recesses to maintain switch blade receiving contacts in proper operative position without additional securing means.

Another object of this invention is to provide a combination switch blade receiving part and wire terminal connection which may be formed on the same piece of material.

Another object of this invention is to provide a combination switch blade and fuse supporting means and associated switch blade receiving parts designed for a large capacity fuse, with means to adapt the same for accommodation of a smaller capacity fuse and yet prevent the use of a larger fuse therein.

Another object of this invention is to provide a switch blade and fuse supporting means with a handle on the front face thereof which also serves to maintain handle supporting members which may be inserted through slots in the back face thereof.

Another object of this invention is to provide permanent means for securing the switch blades to a supporting means which also serve as test points.

Another object of this invention is to provide a combination of a moulded base and housing for the switch receiving contacts with load extension buses to provide for connection to a similar adjoining contact base, and to smaller capacity branches placed on either or both the main and adjoining contact bases.

Yet another object of this invention is to provide a combination switch blade and fuse holding member adapted to have a standard ferrule type fuse inserted end first therein.

Further objects and advantages will appear from the following detailed description of several embodiments of the invention.

In the drawings,

Fig. 6 shows the switch blades inserted in the receiving contacts while Fig. 7 shows them removed from the receiving contacts and Fig. 8 shows the switch blades inserted in "dead" openings which serve to maintain the blades and associated supporting means in an "off" position;

Fig. 18 is a partial plan view of two of the fuse cutout devices shown in Fig. 13 located adjacent each other and electrically connected;

Fig. 19 is a cross-sectional view taken along line 19—19 of Fig. 18;

Fig. 20 is a cross-sectional view taken along line 20—20 of Fig. 18;

The same reference numerals are used to denote similar parts throughout all of the figures.

Figure 1:
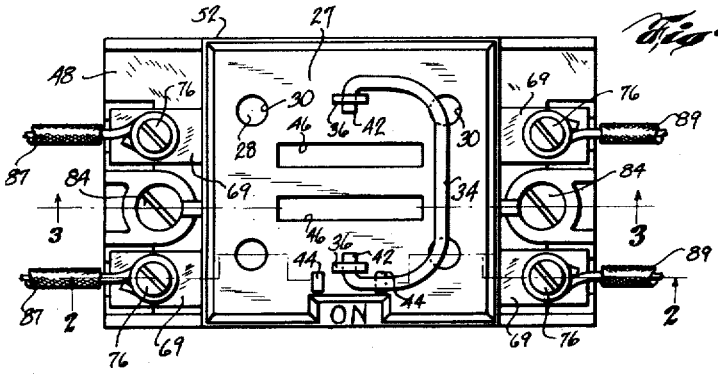
Fig. 1 is a plan view of an assembled form of the circuit interrupting and protective device.
Figure 2:
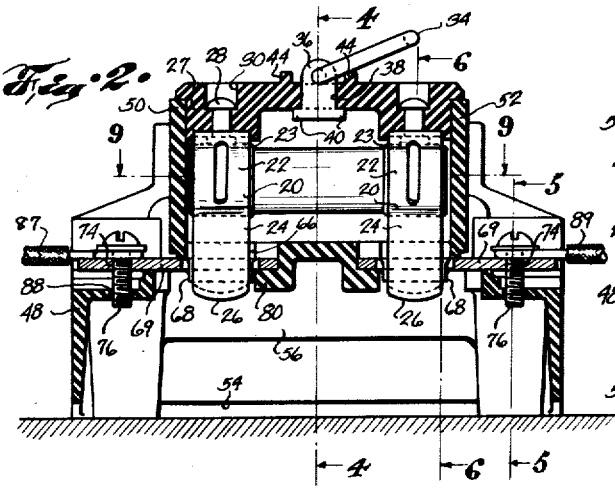
Fig. 2 is a vertical longitudinal sectional view taken along line 2—2 of Fig. 1.
Figure 4:
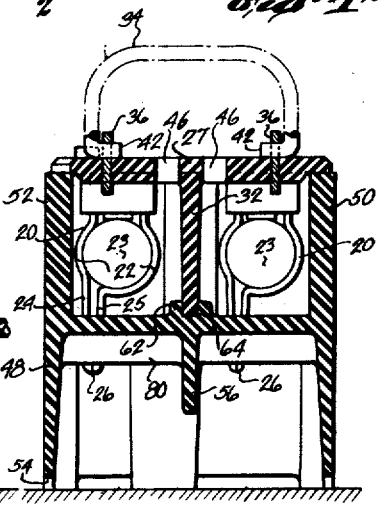
Fig. 4 is a cross-sectional view taken along line 4—4 of Fig. 2.
Figure 3:
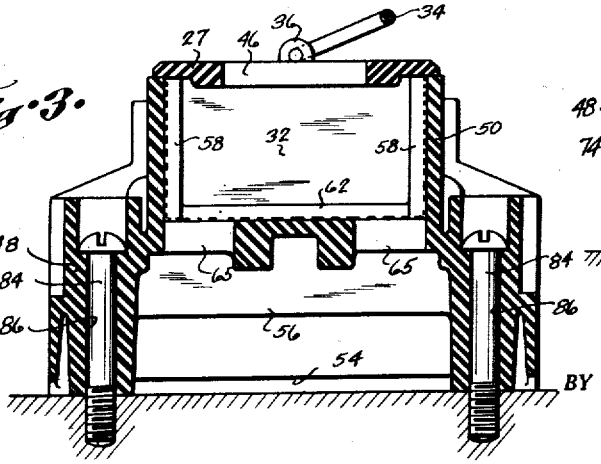
Fig. 3 is a vertical longitudinal sectional view taken along line 3—3 of Fig. 1.
Figure 5:
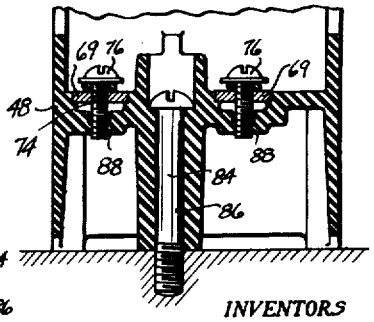
Fig. 5 is a cross-sectional view taken along line 5—5 of Fig. 2.

Referring to the drawings, the numeral 20 indicates a switch blade formed from a conducting material such as copper and provided with an expanded or enlarged portion 22 which is shaped to receive and hold a fuse terminal 23 which may be inserted therein. The expanded portions shown in Figs. 1 to 20 are shaped to receive the terminals of a ferrule type fuse. Each switch blade is provided with end portions 24 and 25 which are substantially parallel and adapted to be inserted in receiving contacts later to be described. Tips 26 are provided on the end portions of the switch blades so that the end portions will fit tightly in receiving contacts and the enlarged portions 22 will clamp the fuse terminal tightly when the end portions of the switch blades are inserted in the receiving contacts and the tips of the end portions meet.

Figure 12:
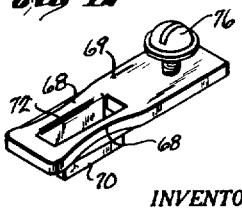
Fig. 12 is a perspective view of one of the receiving contacts shown removed from the supporting base.

The switch blades are secured to a supporting means 27, which may be moulded from "Bakelite" or other insulating material, by rivets 28 in recesses 30. The rivets 28 may be used as convenient test points on the front of the switch blade supporting means, if desired, as they are available to test prongs but not exposed so as to make contact with a person possible. The switch blade supporting means may be provided with a fin 32 which serves to separate adjoining switch blades of opposite polarity. A handle 34 may be provided on the supporting means and is held in lugs 36 which are inserted in openings 38 in the supporting means and positioned by extensions 40 thereon and end portions 42 of the handle. Projections 44 may be provided on the supporting means to maintain the handle in partially raised position. Openings 46 may be provided in the supporting means for ventilating purposes. A contact supporting base 48 may be provided with side walls 50 to form a boxlike housing 52, which may be moulded from "Bakelite" or other suitable insulating material. The base may be provided with recesses 54 to facilitate ventilation, a fin 56, raised portions 58 forming slots 60 along side walls of the housing and raised portions 62 forming a slot 64 on the supporting base. Two sets of openings are provided in the supporting base, a set of "dead" openings 65 and a set of "live" openings 66 which overlie receiving contacts 68. The receiving contacts may be formed from a bar member 69 as shown in Fig. 12, and are provided with extruded portions 70 which are substantially parallel and are formed from the material which is punched from the opening 72, and a suitable terminal connection such as a threaded hole 74 and screw 76. The receiving contacts are supported in the openings in the base by overlying portions 78 (see Fig. 11) and underlying portions 80 of the base. A slot 82, in the base, positions the receiving contact laterally. Screws 84 may be provided to be inserted through holes 86 in the base to secure it to a panel or wall. Holes 88 are provided in the contact supporting base to allow the screws 76 to pass therethrough after the receiving contacts are in place. Normally an electric line 87 is connected to one set of bar members and a load circuit 89 to the other set of bar members as shown.

The contact supporting base and side walls forming a complete housing may be moulded in one piece from some material such as "Bakelite." The slots and openings may be formed in the moulding operation. The contacts may be easily assembled in the base by inserting them without the terminal screw into the slots in the base and securing them thereto by screwing down the terminal screw until it passes through the openings in the base, no other securing means being necessary although in some types of construction it may be desirable to secure the receiving contacts to the base by some additional means, especially if a different type of terminal connection is used. The switch blade supporting means will form a cover for the contact base housing when the switch blades are inserted in the receiving contacts or the dead openings. The fin on the switch blade supporting means slides in the slots on side walls serving to guide the cover and blades into the proper position and to completely isolate circuits of opposite polarity. The switch blades may be inserted into either of the two sets of openings in the base. If the switch blades are in the dead openings, the supporting means may be pulled out, rotated through 180 degrees and then pushed into closed position which will cause the switch blades to be inserted in the receiving contacts. A ferrule type fuse may be inserted end first into the enlarged portion of the switch blades to be tightly clamped therein when the end portions of the switch blades are inserted in the receiving contacts. The presence of a fuse in the enlarged portion of the switch blades causes the end portions of the switch blades to fit tightly in the receiving contacts and thus to provide very good electrical contact therebetween.

Figure 6:
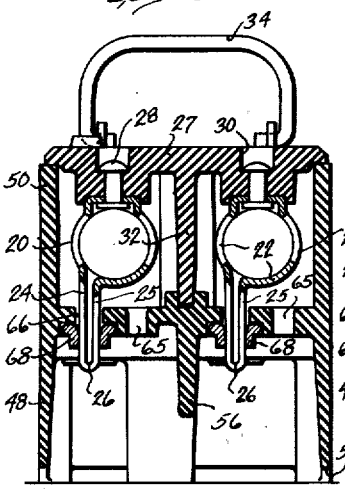
Figs. 6, 7 and 8 are vertical cross-sectional views taken along line 6—6 of Fig. 2.
Figure 7:
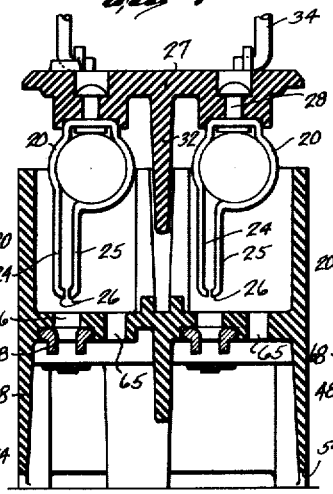
Figure 8:
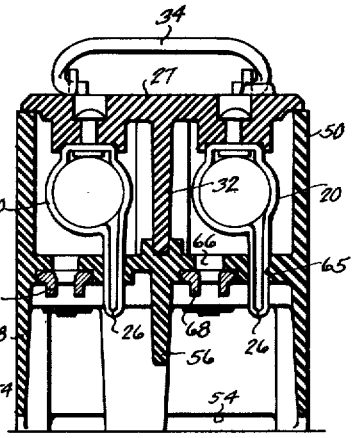
Figure 10:
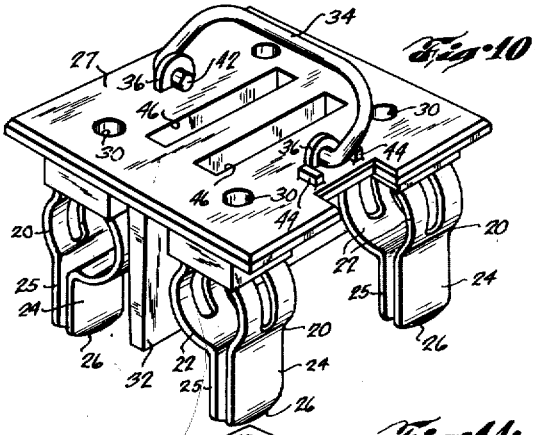
Fig. 10 is a perspective view of the switch blade supporting means with switch blades secured thereto.
Figure 9:
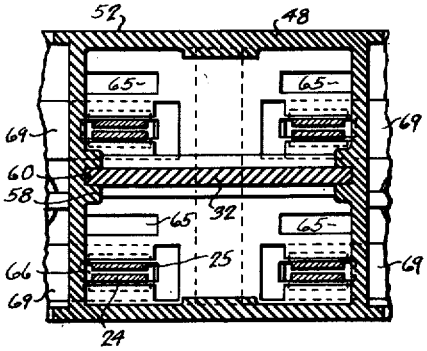
Fig. 9 is a horizontal sectional view taken along line 9—9 of Fig. 2.
Figure 11:
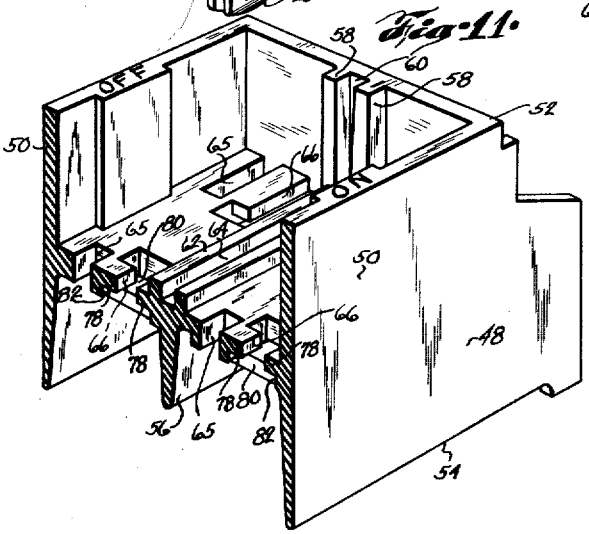
Fig. 11 is a sectional perspective view of the contact supporting base.

Fig. 6 shows the blades inserted into the receiving contacts and thus completing a circuit through the fuses in the switch blades. Fig. 7 shows the position of the fin in the guide as well as other parts after removal of the switch blades from the contacts. Fig. 8 shows the position of the parts after the switch blade supporting means or cover has been rotated 180 degrees from the position shown in Fig. 7 and inserted into the dead openings in the contact base. This latter position is the "off" position while that shown in Fig. 6 is the "on" position.

Figure 14:
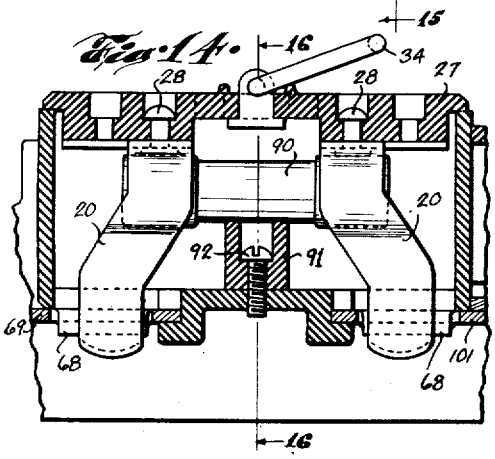
Fig. 14 is a sectional view of a form of the fuse cutout device provided with switch blades which will accommodate a smaller size fuse than is standard for the size of receiving contact base shown.
Figure 16:
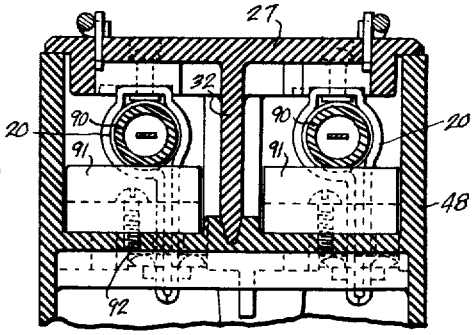
Fig. 16 is a cross-sectional view taken along line 16—16 of Fig. 14·

The supporting housing is so shaped that a number of such housings may be placed adjacent each other on a panelboard and present a neat appearance. In such an installation it may be desirable to use a uniform size of supporting housings for the sake of symmetry and yet to use a smaller size of fuse than can be accommodated in the corresponding switch blade supporting means. For such use we have provided an adaptable type of switch blade as shown in Figs. 14 and 16, which has the end portions 24 and 25 offset longitudinally from the enlarged portion 22. A smaller size fuse 90 can thus be held between these switch blades than if the standard type of blades which have previously been described were used. In order to insure that only the adaptable type of switch blade and its smaller fuse may be used in the circuit for which it is intended, a stop 91 is provided and may be secured to the contact supporting base by any suitable means as by a screw 92. This stop will prevent a large size of fuse from being inserted in a circuit intended to be equipped with a smaller size of fuse.

Figure 13:
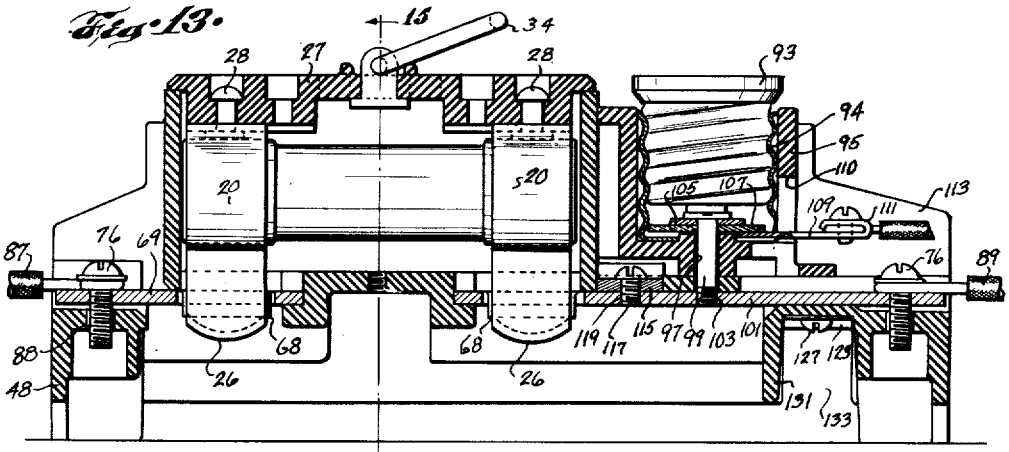
Fig. 13 is a longitudinal sectional view taken along line 13—13 of Fig. 18 of a form of the fuse cutout device provided with branch circuit fuse plugs.
Figure 17:
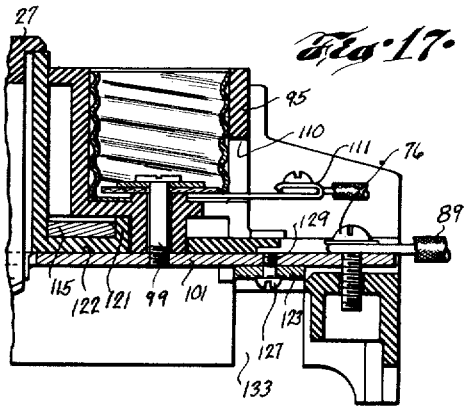
Fig. 17 is a sectional view taken along line 17—17 of Fig. 18.
Figure 15:
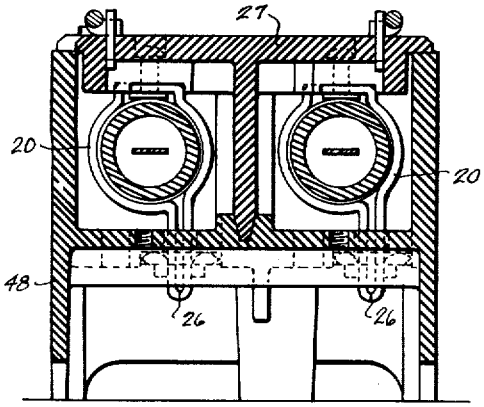
Fig. 15 is a cross-sectional view taken along line 15—15 of Fig. 13.

In many instances it is desirable to provide a pull out switch and fuse device with fuse sockets for branch circuits. One embodiment of our invention so equipped is shown in Figs. 13 and 17, where the numeral 93 indicates a plug type fuse supported in a threaded socket 94. A housing 95 which may be of moulded "Bakelite" surrounds the fuse socket and may be formed so as to be secured on the main contact supporting base 48. An opening 97 extends through this housing to allow a screw 99, which serves as one of the contacts for the plug type fuse, to pass therethrough. A bar member 101 similar to the bar member 69, but longer, is provided with, the receiving contacts 68, a terminal connection, as a threaded hole 74 and screw 76, and a threaded hole 103 to support the contact screw 99. A washer 105 and an insulating washer 107 are placed under the head of the contact screw to clamp a contact strip 109 to the fuse socket.

The contact strip 109 projects through an opening 110 in the housing, is provided with a wire connection terminal 111, and connects the branch circuit through the plug type fuse to the main fuse in the pull out switch. A barrier 113 of insulating material may be provided to separate the two circuits of each pull out housing as shown in Fig. 18.

It is often desirable to connect two adjacent fuse pull out devices. This may be done as shown in Figs. 18, 19, 20 and Figs. 13 and 17, where a conductor bar 115 connects the corresponding circuits of adjoining fuse pull out devices and is secured to the bar members 101 by screws 117 in threaded holes 119. A barrier 121 of insulating material such as "Bakelite" formed integral with the supporting housing provides the necessary electrical clearances between parts. The conductor bar 115 extends across the top 122 of the contact supporting base. A conductor bar 123 is used to connect the other corresponding circuits of the adjacent pull out devices but passes under the top 122 of the supporting base and is secured by screws 127 in threaded holes 129 in the bars 101. Barriers 131 of "Bakelite" or other insulating material provide the necessary electrical clearances between conductors. In order that the standard type of pull out fuse switch may be used when it is necessary to connect two adjacent ones, a "break out" portion is provided in the side walls of the contact base which, when broken out, leaves openings 133 through which the lower connecting bus bar connector 123 passes.

When two of the fuse cutout devices are thus placed side by side and connected as described, it is usual to connect the line circuit as shown in Fig. 13 to the short bar members of one of the fuse cutout devices. The load circuit 89 may be connected as shown to the bar members 101 of the same fuse cutout device and may connect to some distribution center. Additional branch circuits may be connected to the contacts 111 of each fuse cutout device while the longer bar members of the adjacent device may be connected to a large load such as an electric stove or ironer. As normally mounted the plane of the base is mounted vertically and the short or regular bar members are referred to as the upper bar members while the bar members 101 are usually beneath the others and are referred to as the lower set of bar members.

Figure 21:
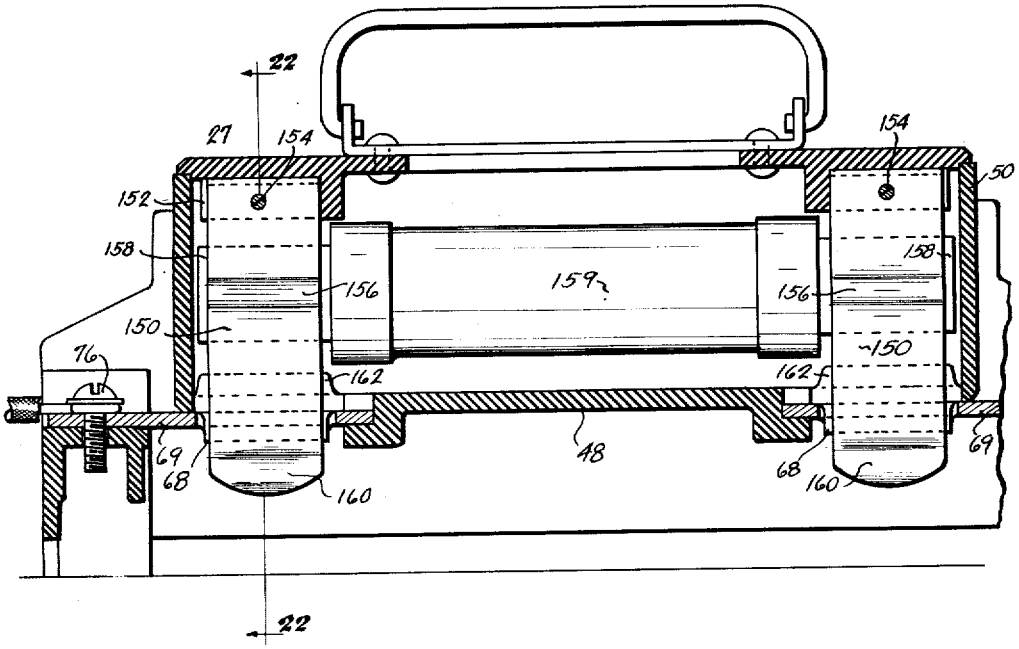
Fig. 21 is a longitudinal sectional view of an embodiment of this invention especially designed for knife blade fuses.
Figure 22:
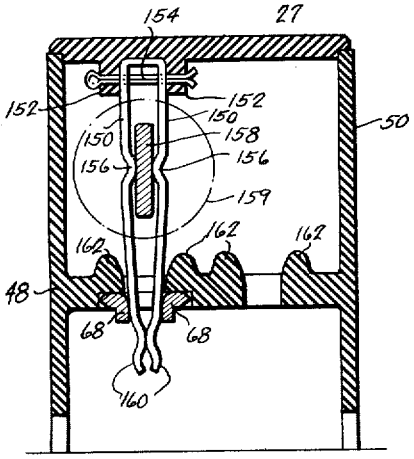
Fig. 22 is a cross-sectional view taken along line 22—22 of Fig. 21.

In Figs. 21 and 22 an embodiment of this invention especially useful in connection with knife blade fuses is shown. The principal difference between this and the other types illustrated and described lies in the combination switch and fuse holding blade. In this embodiment the switch and fuse holding blade 150 which is formed from some conducting material such as copper is secured to a ridge 152 of the supporting means 27 by cotter keys 154. Ridges 156 are provided on the internal sides of the switch blade to make line contact with the knife blade terminal 158 of a fuse 159 which is shown inserted in the blades. The ends of the blades 150 are provided with enlarged portions 160 to facilitate the insertion of the knife blade fuse. The insertion of such a blade into the receiving contacts 68 is facilitated by humps 162 which may be formed integral with the contact supporting base 48. This form of the device is used in the same manner as the other form shown except that the fuse is not inserted end first but merely inserted in the blades as in conventional knife blade fuse clips.

Thus it can be seen that our invention is adaptable to many different requirements and combinations of apparatus. The desirable objects previously set forth are achieved by our invention and because of the unique construction employed it is possible to dispense with many of the parts previously used in such devices and yet provide a device which insures of satisfactory operation with a minimum of contact heating.

While we have shown but several embodiments of our invention, it will be apparent to those skilled in the art that various changes, modifications, substitutions, additions and omissions may be made in the apparatus described without departing from the spirit and scope of our invention as set forth in the appended claims.

We claim as our invention:

1. In a fuse cutout switch, switch blades, switch blade receiving contacts, and a switch blade supporting means, said switch blades being secured to said supporting means and having cooperating end portions extending in a direction substantially perpendicular to the plane of said supporting means and expanded portions adapted to encircle a ferrule type fuse terminal the cooperating end portions being offset on the same side of the center of the expanded portions and arranged to exert pressure against each other when inserted in the receiving contacts.

2. In a fuse cutout switch, switch blades and switch blade receiving contacts, said switch blades having end portions thereof adapted to be inserted in the switch blade receiving contacts and other portions thereof formed to encircle and hold a fuse, the end portions provided with tips which come together when the end portions are inserted in the receiving contacts.

3. A fuse cutout switch comprising switch blades and switch blade receiving contacts, said switch blades having end portions thereof adapted to be inserted in the switch blade receiving contacts and other portions thereof formed to receive and hold a fuse terminal and to exert a clamping action thereon when the end portions of said switch blades are inserted in the switch blade receiving contacts, said end portions arranged to exert pressure against each other when inserted in the switch blade receiving contacts.

4. A fuse cutout switch comprising switch blades, a supporting means therefor, and switch blade receiving contacts, said switch blades being secured to said supporting means and having end portions thereof extending in a direction substantially perpendicular to the plane of said supporting means and expanded portions adapted to receive a fuse terminal therein and exert a clamping action thereon when the end portions of said switch blades are inserted in the switch blade receiving contacts, said expanded portions being substantially farther apart than said end portions.

5. A fuse cutout switch comprising switch blades, switch blade receiving contacts and a switch blade supporting means, said switch blades being provided with end portions adapted to be inserted in the receiving contacts and other portions adapted to receive and hold a fuse terminal, said supporting means being provided with slots having handle supporting members inserted therein, said handle supporting members having one end extending through the supporting means and the other end enlarged to prevent the entire handle supporting member from passing through the slots and a handle supported by the projecting ends of the handle supporting members, said handle serving as a positioning means for the handle supporting members.

6. In a fuse cutout switch, switch blades, a supporting means therefor, a contact supporting base provided with side walls to form a housing, switch blade receiving contacts supported by said base, said switch blades being provided with cooperating end portions adapted to be inserted in said switch blade receiving contacts and other portions formed to encircle a fuse and to exert a clamping action thereon when said end portions are inserted in the switch blade receiving contacts, said cooperating end portions being offset on the same side of the center of the portion adapted to encircle a fuse, and provided with tips which come together when the end portions are inserted in the switch blade receiving contacts, said supporting means cooperating with said housing to form a cover therefor when the switch blades are inserted in the switch blade receiving contacts.

7. A fuse cutout switch comprising a contact supporting base provided with side walls to form a housing, slots and openings in said base, bar members having one end thereof shaped to form a switch blade receiving contact and the other end provided with a wire terminal connection, the slots in said base being adapted to receive and support said bar members so that the switch blade receiving contacts register with some of the openings in the base, switch blades and a supporting means therefor, said switch blades having portions adapted to be inserted through said openings in the base and into said switch blade receiving contacts and other portions adapted to hold a fuse and to exert a clamping action thereon when said switch blades are inserted in said switch blade receiving parts.

8. A fuse cutout switch comprising a fixed contact supporting means, receiving contacts supported thereby, switch blades, and a switch blade supporting means, said switch blades being provided with end portions adapted to be inserted in said receiving contacts and other portions adapted to hold a fuse terminal and exert a clamping action thereon when said switch blades are inserted in the receiving contacts, said end portions being spaced apart a distance substantially less than the diameter of a fuse terminal adapted to be held in the switch blades.

9. A fuse cutout switch comprising a fixed contact supporting means, slots and openings therein, bar members having one end shaped to form a switch blade receiving contact and the other end provided with a wire terminal connection, said slots being adapted to receive and support the bar members so that the switch blade receiving contacts register with some of the openings in the fixed contact supporting means, switch blades and a supporting means therefor, said switch blades having end portions adapted to be inserted in the switch blade receiving contacts and other portions adapted to receive and hold a fuse terminal.

10. A fuse cutout switch comprising a contact supporting means, slots and openings therein, bar members having one end shaped to form a switch blade receiving contact and the other end provided with a wire terminal connection, said slots being adapted to receive and support said bar members so that the switch blade receiving contacts register with some of said openings in the contact supporting means, switch blades and a supporting means therefor, said switch blades having end portions adapted to be inserted in said switch blade receiving contacts and other portions adapted to receive and hold a fuse, and exert a clamping action thereon when the end portions of said switch blades are inserted in said switch blade receiving contacts.

11. A fuse cutout switch comprising a contact supporting means, slots and two sets of openings therein, switch blade receiving contacts supported by said contact supporting means and registering with one of said sets of openings, switch blades and a supporting means therefor, said switch blades being provided with end portions adapted to be inserted into either of said sets of openings and other portions adapted to hold a fuse and exert a clamping action thereon when said switch blade end portions are inserted through the set of openings registering with the switch blade receiving contacts and into the switch blade receiving contacts, the set of openings not registering with said switch blade receiving contacts being adapted to support the switch blades and switch blade supporting means when inserted therein, yet not allowing the switch blades to engage with the switch blade receiving contacts.

12. A fuse cutout switch comprising a contact supporting means, slots and two sets of openings therein, switch blade receiving contacts supported by said contact supporting means and registering with one of said sets of openings, switch blades and a supporting means therefor, said switch blades being provided with end portions adapted to be inserted into either of said sets of openings and other portions adapted to hold a fuse and exert a clamping action thereon when said switch blade end portions are inserted through the set of openings registering with the switch blade receiving contacts and into the switch blade receiving contacts.

13. A switch contact supporting means comprising a base provided with openings therethrough, portions of said base overlying some of the sides of the opening, other portions of said base underlying other of the sides of the opening, the overlying and underlying portions of said base being of such thickness and so separated as to form slots therebetween adapted to accommodate a bar member and maintain it in position against movement transverse to the base, the portion of the opening not covered by either the overlying or underlying portions of said base being adapted to register with a switch receiving contact on a bar member, said not-covered portion being bounded in part by an overlying portion and bounded in another part by an underlying portion of the base.

14. A switch comprising a contact housing provided with a base and side walls therefor, bar members provided with switch receiving contacts on one end thereof, openings in said base having opposite side walls in engagement with the bar member to position the same laterally portions of said base overlying some of said openings, portions of said base underlying the same openings, said overlying and underlying portions of said base being spaced and of such thickness as to form a slot therebetween adapted to accommodate said bar members and position the same in the transverse direction by engagement with the overlying and underlying portions of the base, the portion of said base not covered by underlying or overlying portions registering with the switch receiving contact on the bar members, a switch blade supporting means, and switch blades secured thereto and adapted to be inserted through openings in the base and into the switch receiving contacts on the bar member.

15. A fuse cutout switch comprising switch blades and a supporting means therefor, said switch blades having end portions thereof adapted to be inserted in fixed switch contact receiving parts and other portions adapted to receive and hold a knife blade terminal of a fuse and to exert a clamping action thereon when the end portions of said switch blades are inserted in fixed switch contact receiving parts, said end portions being formed so as to come together beneath the switch blade receiving parts.

16. A switch blade contact receiving part comprising a bar member of conducting material, spaced parallel portions thereof extending in a direction perpendicular to the plane of the bar member, an opening in the bar member between said spaced parallel portions, the length of each of said spaced parallel portions being not greater than one-half the width of said opening plus the thickness of the bar member.

17. A switch blade contact receiving part comprising a bar member of conducting material, spaced parallel portions extended therefrom in a direction perpendicular to the plane of the bar member to form an opening at one end of the bar member between said spaced parallel portions, and a wire terminal connector formed on the other end of said bar member.

18. A fuse cutout switch comprising switch blades, a switch blade supporting means, a contact supporting base, straight slots in said base, bar members provided with switch blade receiving contacts positioned laterally by engagement with the opposite side walls of the said straight slot, said bar members being supported and positioned in the transverse direction by engagement with underlying and overlying portions of the base, plug fuse sockets supported by said base and having one contact thereof electrically connected to said bar members, the switch blades being provided with portions thereof adapted to receive and hold a fuse terminal and to exert a clamping action thereon when said switch blades are inserted in the switch blade receiving contacts.

19. In a fuse cutout switch, a contact supporting base, two pairs of oppositely disposed openings through said base, bar members partially disposed in said openings and positioned laterally by engagement with opposite side walls of the opening and positioned in the transverse direction by engagement with extensions of the base above and below said openings, said bar members provided with switch blade receiving contacts adjacent the end positioned in the openings and terminal connections adjacent the other end, a pair of use sockets positioned above one pair of bar members between the switch blade receiving contact and the terminal connection and electrically connected thereto.

FREDERICK B. ADAM.
HENRY M. STIEGLITZ.

CERTIFICATE OF CORRECTION.

Reissue No. 22,266. February 16, 1943.

FREDERICK B. ADAM, ET AL.

It is hereby certified that error appears in the printed specification of the above numbered patent requiring correction as follows: Page 2, second column, line 30, for "constrction" read --construction--; page 5, second column, line 48, for "use sockets" read --fuse sockets--; and that the said Letters Patent should be read with this correction therein that the same may conform to the record of the case in the Patent Office.

Signed and sealed this 29th day of June, A. D. 1943.

(Seal)

Henry Van Arsdale,
Acting Commissioner of Patents.